(12) United States Patent
Siegel (10) Patent No.: US 8,851,894 B1
(45) Date of Patent: Oct. 7, 2014

(54) DOUBLE-SIDED, FRONT-TO-BACK-ALIGNED, TACTILE LEARNING AID

(76) Inventor: Leslie Siegel, Wellington, FL (US)

( * ) Notice: Subject to any disclaimer, the term of this patent is extended or adjusted under 35 U.S.C. 154(b) by 294 days.

(21) Appl. No.: 13/205,260

(22) Filed: Aug. 8, 2011

Related U.S. Application Data (63) Continuation-in-part of application No. 12/406,605, filed on Mar. 18, 2009, now Pat. No. 8,021,159.

(60) Provisional application No. 61/037,583, filed on Mar. 18, 2008.

(51) Int. Cl.
G09B 21/00 (2006.01)

(52) U.S. Cl.
USPC ........................................................ 434/113

(58) Field of Classification Search
USPC .......... 434/112, 113, 156, 162, 164, 428, 430; 40/584, 615, 616
See application file for complete search history.

(56) References Cited

U.S. PATENT DOCUMENTS

| | | | |
|---|---|---|---|
| 1,244,000 A | 10/1917 | Soltoft | |
| 3,598,042 A | 8/1971 | Boyd | |
| 3,758,962 A | 9/1973 | Bagdasar | |
| 3,789,517 A | 2/1974 | Romstad | |
| 3,811,205 A | 5/1974 | Pitzler | |
| 4,210,093 A | 7/1980 | Baker | |
| 4,731,207 A * | 3/1988 | Matsumoto et al. | 264/434 |
| 5,066,234 A | 11/1991 | LeDesma | |
| 5,152,690 A | 10/1992 | Todd | |
| 5,167,505 A | 12/1992 | Walsh | |
| 5,193,921 A | 3/1993 | Tsukuda et al. | |
| 5,395,245 A | 3/1995 | Heinz | |
| D360,654 S * | 7/1995 | Castilloux | D20/42 |
| D373,144 S | 8/1996 | Hansen | |
| 6,716,033 B1 | 4/2004 | Lassowsky | |
| 6,799,515 B2 * | 10/2004 | Lynn et al. | 101/483 |
| 7,014,468 B1 | 3/2006 | Thorpe | |
| 7,153,138 B2 | 12/2006 | Charles | |
| D561,260 S * | 2/2008 | Ferry et al. | D20/19 |
| D570,238 S * | 6/2008 | Pickett, Jr. | D10/109.1 |
| 2004/0067470 A1 | 4/2004 | Morris | |
| 2006/0040240 A1 | 2/2006 | Kopilevich | |
| 2006/0188858 A1 | 8/2006 | Knepper | |

FOREIGN PATENT DOCUMENTS

EP 2072273 6/2009

* cited by examiner

*Primary Examiner* — Kurt Fernstrom
(74) *Attorney, Agent, or Firm* — H. John Rizvi; Gold & Rizvi, P.A.

(57) ABSTRACT

A double-sided, front-to-back aligned tactile learning aid is provided, which includes a substantially planar carrier medium with a protruding front tactile graphic aligned with a protruding back tactile graphic. The carrier medium may be one, two, or more sheets of standard paper, thicker Braille-type paper, a polymer material, or other generally planar material. The front graphic and the back graphic protrude from the front and back, respectively, of the carrier medium. At least a portion of the back tactile graphic is aligned with at least a portion of the front tactile graphic. The double-sided, front-to-back aligned tactile learning aid is clearly expressive of (and/or representational of) a physical structure, yet is embodied in a generally two-dimensional planar construction, so is easier to store. The double-sided, front-to-back aligned tactile learning aid may be used as a semi-concrete aid for sighted and visually-impaired students.

22 Claims, 11 Drawing Sheets

DOUBLE-SIDED, FRONT-TO-BACK-ALIGNED, TACTILE LEARNING AID

CROSS-REFERENCE TO RELATED APPLICATIONS

This continuation-in-part application claims the benefit of co-pending U.S. Non-Provisional patent application Ser. No. 12/406,605, filed on Mar. 18, 2009, which claims the benefit of U.S. Provisional Patent Application Ser. No. 61/037,583, filed on Mar. 18, 2008, both of which are incorporated herein in their entirety.

FIELD OF THE INVENTION

The present invention relates generally to a teaching or learning aid, and more particularly, to a double-sided, tactile teaching or learning aid with front-to-back-aligned raised graphics.

BACKGROUND INFORMATION

Teachers have found learning aids beneficial to introduce, teach, and reinforce concepts and facts in all subjects. Conventional learning aids are available in a myriad of types and kinds, from the traditional math fact flash cards to hands-on manipulative learning aids ("manipulatives"). It is well known by those skilled in the art that learning is promoted by beginning at a concrete level, such as with concrete manipulative objects, and then moving to an abstract level, such as using numerals on paper to represent the concrete objects.

Manipulatives are particularly effective in helping a student understand mathematic concepts, such as addition, subtraction, multiplication, division, geometry, etc. By providing a manipulative, the teacher can allow the student to move from the concrete experience of investigating the manipulative to the abstract concept being taught that is represented by numerals written on paper. These math manipulatives include, for example, interlocking units to form rods, colored rods of varying lengths, base ten blocks, abacus, and the like. However, not all students find it easy to move from the concrete to the abstract. The semi-concrete or demi-concrete learning aid of the present invention advantageously supplies a tactile bridge from the concrete to the abstract. Though strictly pictorial and two-dimensional learning aids are available (for example, a two-dimensional printed picture of a learning aid supplied to the student or a sketch by the student of a learning aid), these have no tactile aspect. Thus these are limited in usability for sighted students and unusable for visually handicapped students.

Also, storage of all of the manipulatives that a teacher finds useful is a challenge. While the manipulatives assist the student in learning, they are by their very three-dimensional nature cumbersome to store, to maintain, to distribute to students, to collect from students, and to send home with students. The learning aid of the current invention serves the purpose of a manipulative, yet is easier to store, maintain, distribute, collect, and transport.

Another challenge for teachers is teaching blind and visually-impaired students. Much of the learning for these students occurs through touch, yet the number and types of learning aids that are available and suitable for visually-impaired students is limited. The BANA Tactile Graphic Guidelines (the official North American reference jointly compiled under the authority of the Braille Authority of North America and the Canadian Braille Authority, L'autorité Canadienne Du Braille) lists single-sided tactile learning aids for visually-impaired students along with Braille learning aids.

Costly braille embossers (using specialized Braille paper) can emboss Braille (raised dot characters in a two vertical column, 6-dot cell layout) on one or both sides of the paper. Two-sided Braille embossing is called "interpoint" as the points on the front side of the paper are placed in between the points on the back side so they do not overlap and are never aligned. Braille embossing may also produce dots of varying heights—thus providing a dotted graphic formed of raised dots that can be felt by passing the fingers over it.

Tactile prints of graphic images may also be formed by machines that make raised line drawings on special capsule or swell paper. Image makers can draw, print, or photocopy graphics onto the swell paper. Heat causes the lines to swell, producing a tactile graphic on the front of the paper, allowing the graphic to then be felt with the fingers.

Additionally, the incidence and/or recognition of autism spectrum disorders (ASD) are increasing in the world today. It has been shown that students with ASD are more involved and learn more easily with learning aids that encompass using their senses. It would be advantageous to provide suitable tactile learning aids for students with ASD.

Accordingly, there is an established need for a double-sided, front-to-back aligned tactile learning aid that meets the need for a sturdy, easy-to-store, semi-concrete manipulative usable for teaching math and other subjects, while enhancing learning for sighted students, visually-impaired students, and students with ASD.

SUMMARY OF THE INVENTION

The present invention is directed to a double-sided, front-to-back aligned graphic learning aid, which includes a substantially planar carrier medium with a front tactile graphic protruding from the carrier medium front surface and a back tactile graphic protruding from the carrier medium back surface. At least a portion of the protrusion of the back tactile graphic is aligned with at least a portion of the protrusion of the front tactile graphic. When the fingers are run along the carrier medium the aligned front graphic and back graphic are felt simultaneously, expressing the concrete object. Non-tactile graphics or tactile, non-aligned graphics may be additionally included on the carrier medium to further instruction or for information.

The front-to-back aligned tactile learning aid is expressive of a three-dimensional physical structure, yet is embodied as raised protrusions on a generally two-dimensional planar construction, so is easier to store. The front-to-back aligned tactile learning aid may be used as a semi-concrete (or demi-concrete) manipulative to teach various subjects for sighted and visually-impaired students. Therefore, the student would typically learn with a manipulative object (such as three-dimensional unit blocks representing two plus five); then would progress to using the semi-concrete front-to-back aligned tactile learning aid of the present invention (with a front and back raised aligned graphic of two objects plus five objects touchable from the front and from the back simultaneously as the child runs the card between his fingers); lastly the student would progress to the abstract concept (such as numerals on paper representing the numbers, in this example "2+5").

Though the double-sided front-to-back aligned tactile learning aid is particularly shown as usable in a math manipulative, as herein particularly demonstrated, it is also advantageously usable to teach other subjects and lessons.

An object of the present invention is to provide a double-sided, front-to-back aligned tactile learning aid that has at least a portion of the protrusion of a back graphic aligned with at least a portion of the protrusion of a front graphic in a manner that both the front and the back of the aligned graphic can be felt by a student.

Another object of the present invention is to provide a double-sided, front-to-back aligned tactile learning aid that is generally planar, yet is expressive of, or representational of, a three-dimensional structure.

A further object of the present invention is to provide a double-sided, front-to-back aligned tactile learning aid that is easier to store than a corresponding three-dimensional structure.

An additional object of the present invention is to provide a double-sided, front-to-back aligned tactile learning aid that is adapted for teaching visually-impaired students.

These and other objects, features, and advantages of the present invention will become more readily apparent from the attached drawings and from the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Shown throughout the figures, the present invention is directed toward a double-sided, front-to-back aligned tactile learning aid, which provides advantages in teaching both sighted and visually-impaired students. It includes at least one front tactile graphic aligned with at least a portion of one back tactile graphic. The double-sided, front-to-back aligned tactile learning aid 10 is expressive of, and/or representational of, a three-dimensional physical structure, yet is embodied in a generally two-dimensional planar construction (with front and back protrusions), so is convenient to use and easier to store. It can be used for teaching any of a variety of subjects. It is particularly adapted for teaching mathematics, as it serves to create a semi-concrete bridge between concrete three-dimensional manipulatives and abstract representational numerals on paper, both for sighted and visually-impaired students. The double-sided, front-to-back aligned tactile learning aid is also particularly adapted to assist visually-impaired students, special education students, learning disabled students, and/or mentally handicapped students.

Figure 1:
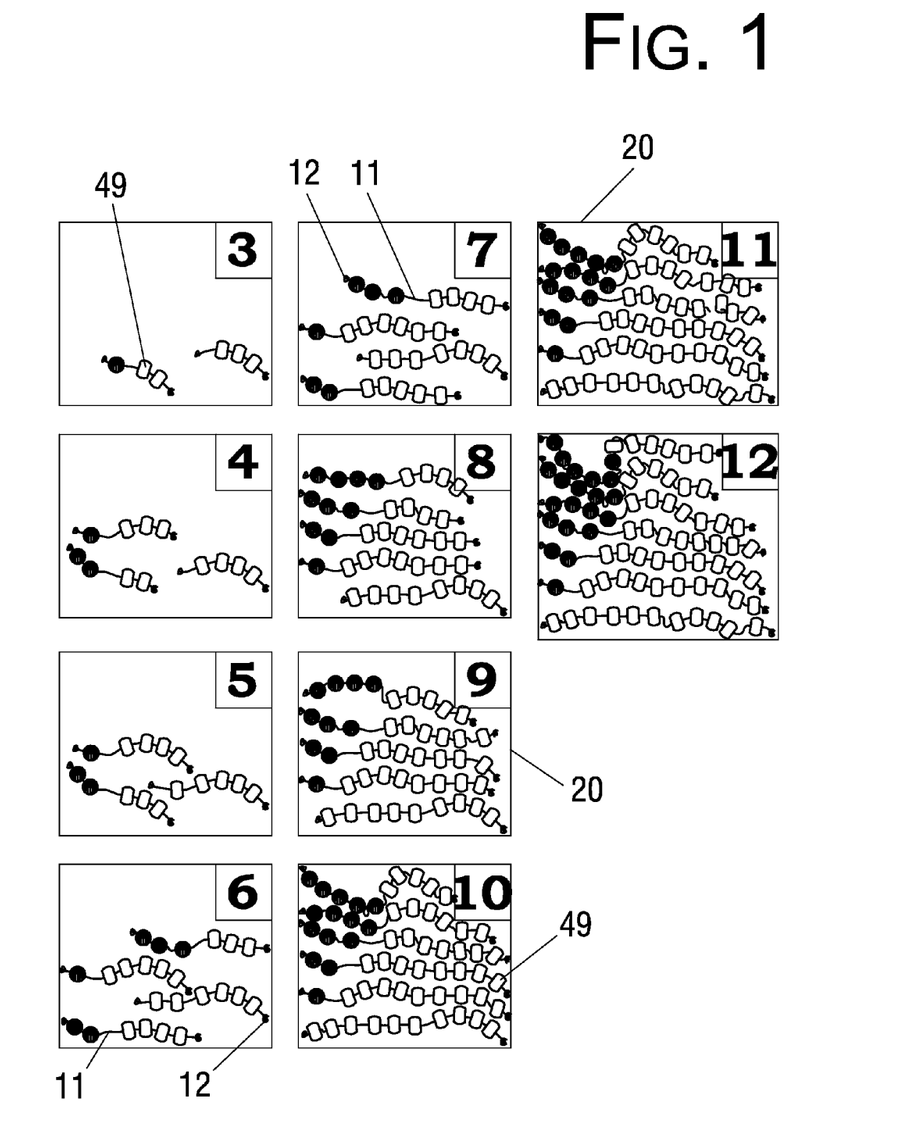
FIG. 1 is a top schematic view showing concrete objects of an addition/subtraction set comprising ten number family sub-sets of a string math manipulative system.

FIG. 1 illustrates a string math manipulative system and method for teaching addition and/or subtraction; the double-sided, front-to-back aligned tactile learning aid of the present invention is usable to represent the manipulatives used in this method. Holed objects 49 have a discriminating characteristic or variation, such as variations of colors, shapes, sizes, textures and/or materials. Two discriminating characteristics or variations are used within one set to represent the numerals of a math fact. One or more holed objects 49 having a first discriminating characteristic are threaded on a string 11, with most strings 11 of the set having one or more holed objects 49 with a first discriminating characteristic and one or more holed objects with a second discriminating characteristic. The holed objects 49 are threaded upon the strings 11 in specific configurations, with the particular number of, and color/shape/texture/size/material variations of, the holed objects 49 corresponding to and representing the math facts in a number family. Both ends of each string 11 terminate in a retaining mechanism 12 to retain the series of holed objects 49 on the string 11. The pre-set organization of the holed objects 49 on strings 11 encourages learning, eliminating the seemingly un-relatedness or separateness of math facts. The math facts do not have to be memorized in isolation. This organized method helps the student to achieve mastery more quickly and to gain a better understanding of the concepts, advantageously resulting in less teaching time and less student anxiety. Yet, typically, numerous learning sessions will be required.

Figure 2:
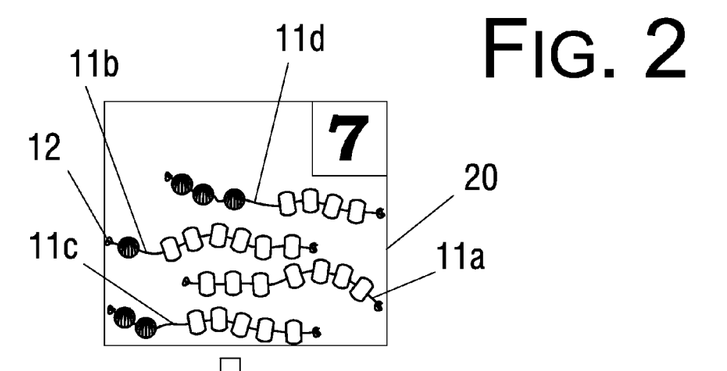
FIG. 2 is a top schematic view showing concrete objects of the sub-set of the number family of "7", of a string math manipulative system, which is suitable for representation by the double-sided, front-to-back aligned tactile learning aid of the present invention.
Figure 3:
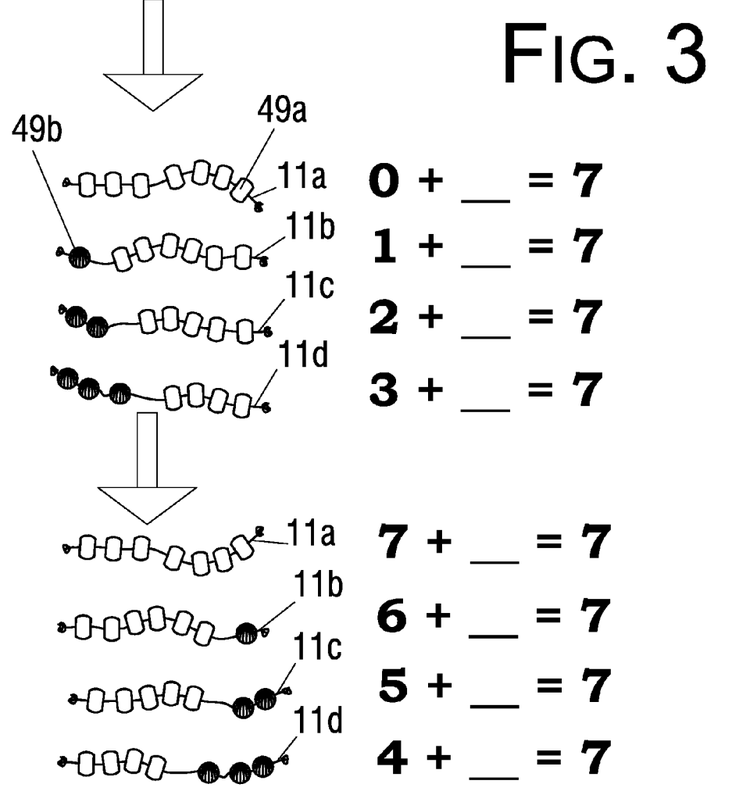
FIG. 3 is a top schematic view showing the method of teaching the number family of "7" of a string math manipulative system, which is suitable for representation by the double-sided, front-to-back aligned tactile learning aid of the present invention.

Referring now to the illustration of FIGS. 2-3, the method used to teach addition math facts using the addition/subtraction set of the first preferred embodiment of the present invention is shown. FIG. 2 shows a single sub-set (the sub-set of the "7" number family) of the addition/subtraction sets of FIG. 1. FIG. 3 shows the addition facts associated with the "7" number family sub-set.

To begin the instruction for addition, the sub-set of the desired number family with which the student is to work is selected; in this example, the number family of "7" is chosen. The four strings are removed from the container 20 that is designated "7". Each string is threaded with seven holed objects. A first string 11*a* is threaded with seven holed objects of a first variation, having a first discriminating characteristic (for example, a first shape and a first color), designated 49*a*, representing 7+0=7 or 0+7=7. A second string 11*b* is threaded with seven holed objects 49*b* of a second variation (a second shape and/or a second color), with six holed objects being of a first variation 49*a* and with one holed object being of a variation 49*b*, representing 6+1=7 or 1+6=7. A third string 11*c* is threaded with five holed objects of the first variation 49*a* and with two holed objects of the second variation 49*b*, representing 5+2=7 or 2+5=7. The third string 11*c* is threaded with four first-variation holed objects 49*a* and with three second-variation holed objects 49*b*, representing 4+3=7 or 3+4=7.

The strings 11*a*, 11*b*, 11*c*, 11*d* (FIG. 2) are then put in order from the string having no second-variation holed objects 49*b* (string 11*a*) to the string having the most second-variation holed objects 49*b* (string 11*d*). For tactile practice in the addition facts that add up to seven, the student may separate the objects between the two variations, pulling the variations to different ends of the string. The student may move holed objects 49 along string 11 to physically mirror the math operation. Further the student may hold the first-variation holed objects 49*a* in one hand and the second-variation holed objects 49*b* in the other hand. Also, the student may demonstrate and verbalize to himself or herself, or to others, the addition of the first-variation holed objects 49*a* to the second-variation holed objects 49*b*.

Concrete, tactile experiences of these types with the string math manipulative help students internalize the math facts and understand the concept behind the facts, as opposed to only learning the math facts by rote memory.

To teach the remaining addition facts, the strings 11*a*, 11*b*, 11*c*, 11*d* are flipped over or rotated 180 degrees; thereby, for example, string 11*d*, which previously represented 3+4=7, will now represent 4+3=7. This also introduces the students to the commutative property of addition. Flipping the strings allows the student to see the total number of math facts to learn is less than the number of math facts when written out on paper. Therefore memorization feels finite and more manageable to the student, who now sees the math facts for the number family as a unit. Though for purposes of description smaller numbers have been used, optionally, larger numbers may also be used, such as 13×8 or 179/8.

FIGS. 4-6, 8-13, 15-25 show the double-sided, front-to-back aligned tactile learning aid 10 of the present invention that may be used to represent the math bead-on-string manipulatives of FIG. 1-3, used for teaching other math lessons, or used for teaching other subjects as shown in FIG. 17-20. The front-to-back aligned tactile learning aid 10 includes a tactile, raised, representational image 15 (FIG. 9, 10, 11) on the front that is aligned to an inverse, tactile, raised, representational image 14 (FIG. 10, 11, 12) on the card 39 back.

The front-to-back aligned tactile learning aid 10 is designed to bridge the gap between the concrete (the student's interaction with the physical objects, such as shown in FIG. 1-2, by touching and moving the three-dimensional object) and the abstract (such as using written numerals to symbolize the math fact). Moreover, storage space required by the tactile learning aid 10 of the present invention is minimal compared to the physical objects. Though some students are quickly able to jump from the concrete to the abstract, it presents a significant hurdle to a large number of students—and all students can benefit by at least some exposure to the intermediary semi-concrete stage presented by the front-to-back aligned tactile learning aid 10.

Figures 4, 5:
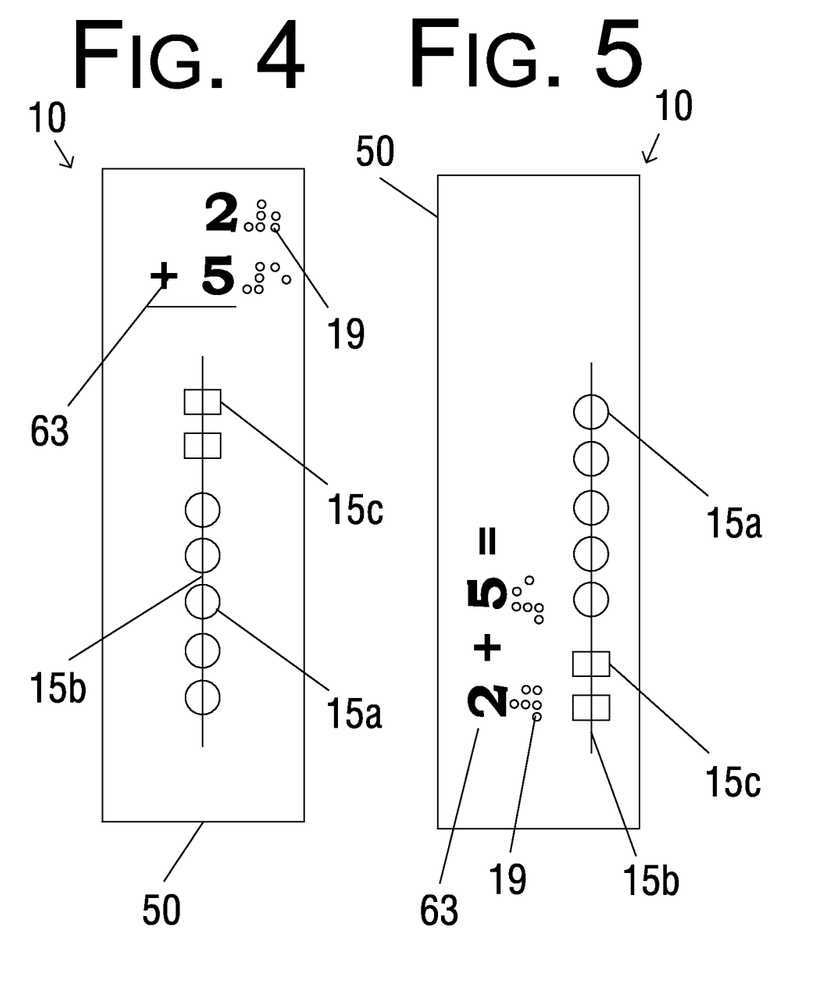
FIG. 4 is a front schematic view illustrating a vertical representational double-sided, front-to-back aligned tactile learning aid of the present invention.
FIG. 5 is a front schematic view illustrating a horizontal representational double-sided, front-to-back aligned tactile learning aid of the present invention.

The front-to-back aligned tactile learning aid 10 of FIG. 4-5 represents the math fact presented by the 3-dimensional physical objects (first-variation holed objects 49*a* and second-variation holed objects 49*b*, as illustrated in FIG. 3). The front-to-back aligned tactile learning aids allow the student to take incremental steps between the 3-dimensional physical objects (first-variation holed objects 49*a* and second-variation holed objects 49*b*) and the written numeral math facts.

The student preferably initially uses the dimensional physical object (strings 11 with beads, FIG. 1-2) to understand the concept presented. Next the student is presented with multiple front tactile graphics 15 (FIG. 9-13) aligned with multiple back tactile graphics 14 of the generally planar tactile learning aid 10 representing the physical objects. Later the math facts can be presented in numerals on paper. Thus the leap that was required to jump from the concrete objects to the abstract numerals is bridged by the intermediary semi-concrete front-to-back aligned tactile learning aid 10 of the present invention.

A portion of the double-sided, front-to-back aligned tactile learning aid 10 of the present invention may also include a single-sided, non-aligned raised graphic or a flat printed graphic (such as the non-tactile printed numeral math fact 13 of FIGS. 23-25), as necessary to assist the student or teacher. As shown in FIGS. 4-5, the front-to-back aligned tactile learning aid 10 may also include raised Arabic numerals 63 (including associated math symbols) and/or raised Braille numerals 19 for visually handicapped students. For example, in FIGS. 4-5, the math fact (numerals and symbol 63) can be raised and touchable. Or alternatively or additionally, the math fact can be written in Braille 19. A logo or raised pattern may be imprinted to orient the student to the top and bottom of the card, if desired (not shown). Optionally, a top corner may be cropped (not shown) to allow a visually-impaired student to quickly turn the card upright and to allow all students to easily align a set of cards.

Tactile, touchable graphics or images may be placed on the carrier medium 50 by any tactile-graphic creation method that is known, or becomes known, in the art. The aligned tactile graphics (top surface front tactile graphic 15 and bottom surface back tactile graphic 14) may be created independently (and then joined) or simultaneously. The tactile-graphic creation method includes methods using swell paper, embossing, thermoform, injection molding, vacuum molding, photo-etching, gel application, adhering of discrete components onto the carrier medium, and the like. One exemplary method to obtain touchable images is by using an image enhancer with a specialized, durable swelled and/or capsulated paper that causes the black ink, lines to protrude or rise up, as is known in the art. Optionally, color can be printed, also.

A second exemplary method to produce raised images is to utilize an embosser with plain paper or oak tag. The embossing machine is used to form raised dots (similar to Braille dots) in the shapes of the objects and of the string. The embossing machine can also add the math fact problem in Braille. Preferably the paper is run through a regular printer to put colored ink on top so that the raised object shapes are in color and the numbers are printed in regular numbers for use by a sighted person.

A third method to create the double-sided front-to-back aligned tactile learning aid 10 is the adhering of a raised or textured portion onto the top surface and onto the bottom surface of the learning aid 10. For example, two corresponding textured images (such as sandpaper images or cardboard images) can be adhered in an aligned manner on the top and bottom surface of the planar carrier medium.

A fourth method to create the double-sided front-to-back aligned tactile learning aid 10 is through molding techniques (injection molding, vacuum molding, or the like). This method creates both the raised front and raised back graphic simultaneously.

Figure 7:
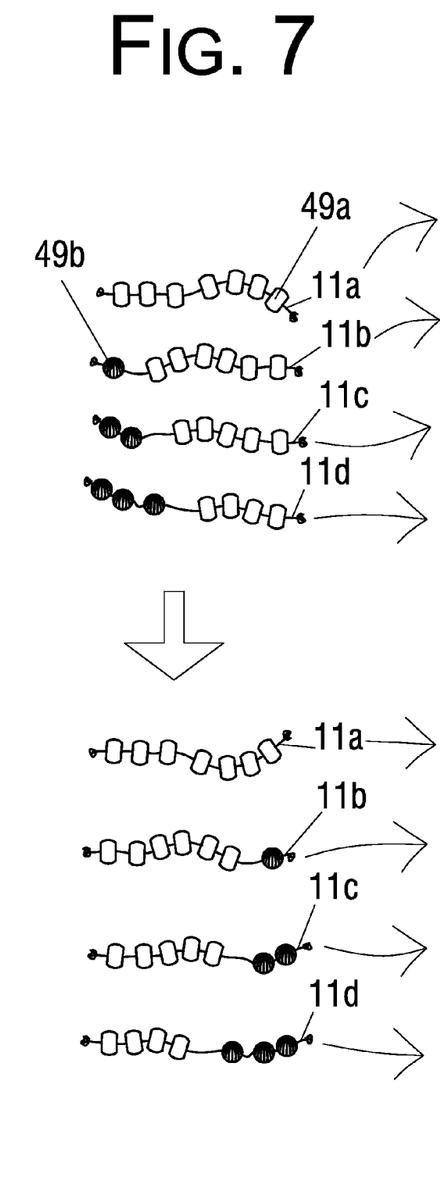
FIG. 7 is a front view showing the three-dimensional structure of an exemplary math manipulative set and a method of use, which is suitable for representation by the double-sided, front-to-back aligned tactile learning aid of the present invention.
Figure 8:
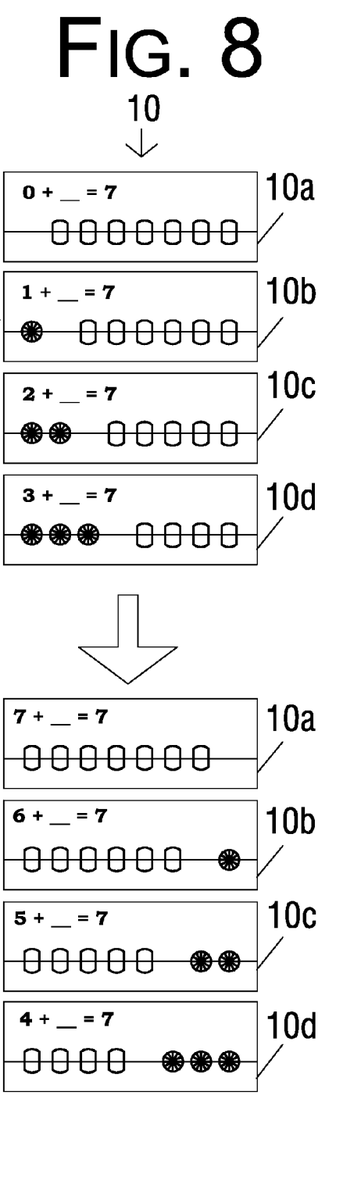
FIG. 8 is a front view illustrating a set composed of multiple double-sided, front-to-back aligned tactile learning aids (generally planar with raised protrusions) of the present invention that correspond to, and are clearly expressive of and representational of, the three-dimensional structure of the prior art math manipulatives of FIG. 7.

The double-sided front-to-back aligned tactile learning aid 10 (which provides not only touchable, raised protrusions, but may be highly textured and/or color coded) involves more senses, helping the normal or the visually impaired student learn. The physical beads and string that correspond to a specific front-to-back aligned tactile learning aid 10 may be matched or compared to the learning aid 10 for additional reinforcement, as shown in FIG. 7 and FIG. 8.

Figure 6:
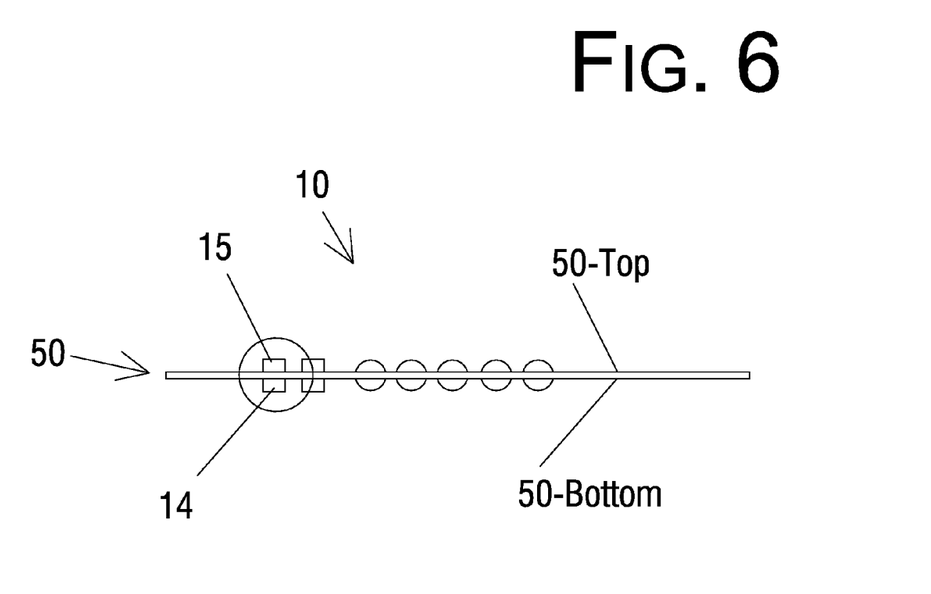
FIG. 6 is a top view illustrating the double-sided, front-to-back aligned tactile learning aid of FIG. 5.
Figure 6A:
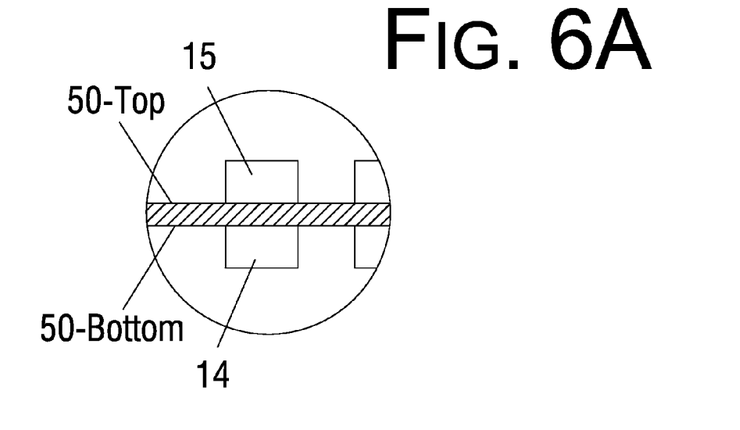
FIG. 6A is a detail view of circle 6A of FIG. 6, illustrating the double-sided, front-to-back aligned tactile learning aid of the present invention.

An exemplary method of forming the double-sided, front-to-back aligned tactile learning aid of the present invention is shown in FIG. 6A. Two sheets (50-top and 50-bottom) are embossed with raised beads and string. The embossed graphics are the reverse of each other so that, when the two sheets are placed back to back, the graphics are aligned. The sheets (50-top, 50-bottom) are attached back to back by adhesive or other adhering means. The back sheet/page is the reverse of the front sheet/page, so that the beads can be felt simultaneously on both the front and the back. This provides a learning aid that is an incremental semi-abstract step (front-to-back aligned tactile learning aid 10) between the 3-dimensional physical object (the actual holed objects on the string) and the abstract numerals on paper. The front-to-back aligned tactile learning aid 10 demonstrates in a visual, concrete, tactile way, the association of the related math facts.

Figure 21:
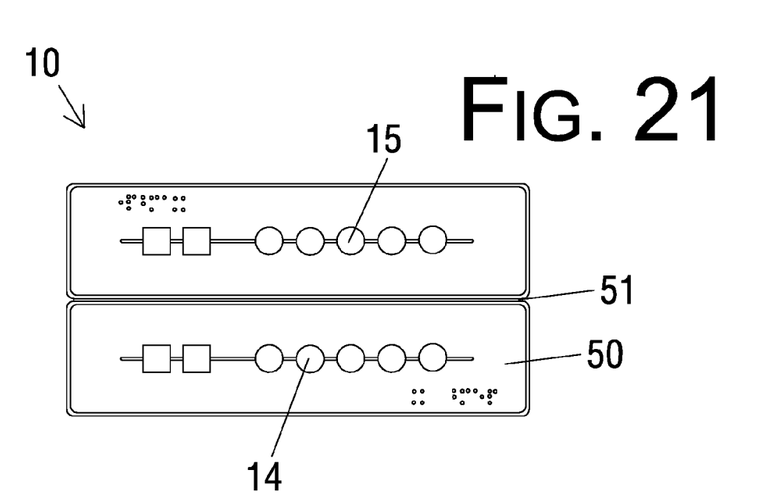
FIG. 21 shows a top view of an additional embodiment of the double-sided, front-to-back aligned tactile learning aid of the present invention, which is integrally molded, then folded in a manner that allows a protrusion on the back surface to align with a protrusion on the front surface.
Figure 22:
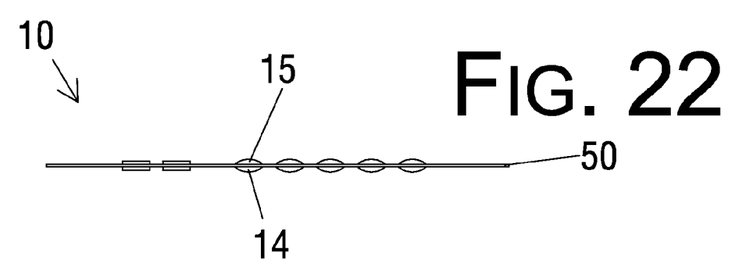
FIG. 22 shows a side view of the folded double-sided, front-to-back aligned tactile learning aid of the present invention of FIG. 21.

Any method that can form front-to-back aligned protrusions on a carrier medium is within the scope of the invention. These include swell paper, embossing, thermoform, injection molding, vacuum molding, photo-etching, gel application, other commercial production methods, and the like. For example, as shown in FIG. 21-22, the learning aid may be molded as a single entity and then folded along a fold line 51 (to achieve the front-to-back alignment of the front tactile graphic 15 and back tactile graphic 14), with an adhesive or other closure method applied to retain the learning aid in the folded, aligned position.

An additional benefit occurs with opposite operations, for example, addition and subtraction. The student reads the front string from left to right for addition and feels of the back string from right to left for subtraction. For example, the front of the card has 4+6=10, and the back of the card has 10−6=4.

Additionally, the double-sided raised image front-to-back aligned tactile learning aid 10 is generally easier to carry and use than the physical string and holed objects. For example, a student might be able to conveniently review the double-sided raised image front-to-back aligned tactile learning aid 10 in a car or outside. These double-sided raised image front-to-back aligned tactile learning aids 10 will educationally benefit many types of students such as educable mentally handicapped, physically handicapped, low-vision, specific learning disabled, preschool students, regular education students, etc.

The ability of the double-sided, front-to-back aligned tactile learning aid of the present invention to effectively represent three-dimensional objects or manipulatives is illustrated in FIG. 7 and FIG. 8.

FIG. 7 shows the set of FIG. 3 of beads-on-a-string manipulatives (strings 11a, 11b, 11c, 11d) used to teach the addition facts that sum to the number "7". As shown in FIG. 8, each of a particular set of double-sided, front-to-back aligned tactile learning aids 10a, 10b, 10c, 10d is a generally planar representation of the prior art manipulative used to teach an addition fact that sums to the number "7" and may be manipulated to communicate the same math fact in a similar manner as described (including flipping the double-sided, front-to-back aligned tactile learning aid 10 to represent the corresponding addition fact).

Figure 9:
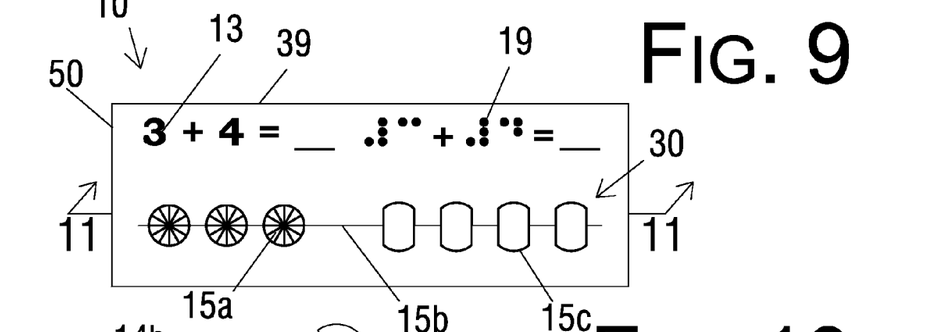
FIG. 9 shows a front view of the preferred embodiment of the double-sided, front-to-back aligned tactile learning aid of the present invention.
Figure 10:
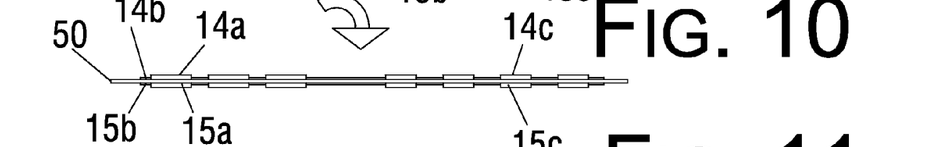
FIG. 10 shows a top edge view of the learning aid of FIG. 9 with the front of the card facing downward and the back of the card facing upward.

FIG. 9 to FIG. 13 show a single tactile learning aid 10 in multiple positions. The double-sided, flashcard-type learning aid 10 includes a substantially planar carrier medium 50 with multiple tactile graphics 15 aligned with multiple back tactile graphics 14. The learning aid 10, though generally planar, is a tactile representation of the three-dimensional object 49 of FIG. 7 on a two-dimensional surface with a slightly raised and/or textured three-dimensional aspect to the details which form the front tactile graphic 15 and back tactile graphic 14 (and optionally the string graphic 14b, as shown in FIG. 10).

The carrier medium 50 is configured to carry or provide a support medium for the aligned graphics. The carrier medium 50 may be one or more sheets of standard paper, thicker Braille-type paper, thermoform, a polymer material, a composite (such as a composite of two types of paper or of paper and plastic) or other generally planar material to which raised graphics may be applied, may be incorporated, may be unitarily formed, or may be produced, as is known in the art.

The front graphic 15 and the back graphic 14 protrude from the front surface and back surface, respectively, of the carrier medium 50. At least a portion of the back tactile graphic 14 is aligned with at least a portion of the front tactile graphic 15. (The aligned portion is designated number 30.) The tactile graphics may include text (alphabetical and/or numerical), images, signs, icons, symbols, objects, geometrical figures (including shapes and types of angles), Braille, charts, fractions (such as pie charts or pieces of an object), and the like. The tactile graphics may be formed with outlines (such as the outline of 15c, FIG. 9), colors (for sighted students), and/or textures (such as the texture of 15a, FIG. 9). The tactile graphics may be formed by any of the various techniques for producing raised, swelled, embossed, or otherwise touchable graphics, as is known in the art. As also discussed above, for example, injection or vacuum molding techniques may produce the teaching aid 10 unitarily, embossers may be used to emboss one or both sides of paper, heat may be used to swell capsule paper (also known as swell paper—having a special coating of heat reactive chemicals, such as microcapsules of alcohol embedded in the paper that burst when exposed to heat and make the surface of the paper swell up), or portions of graphics may formed from a separate sheet and then adhered in an aligned manner to the front and back surfaces of the carrier medium 50. The front graphic 15 and the back graphic 14 may be formed on a single sheet of carrier medium 50, or, optionally, may be formed on separate sheets of carrier medium 50 which are then adhered back-to-back with the front graphic 15 aligned to the back graphic 14, as shown in FIG. 6A.

Figures 11, 12:
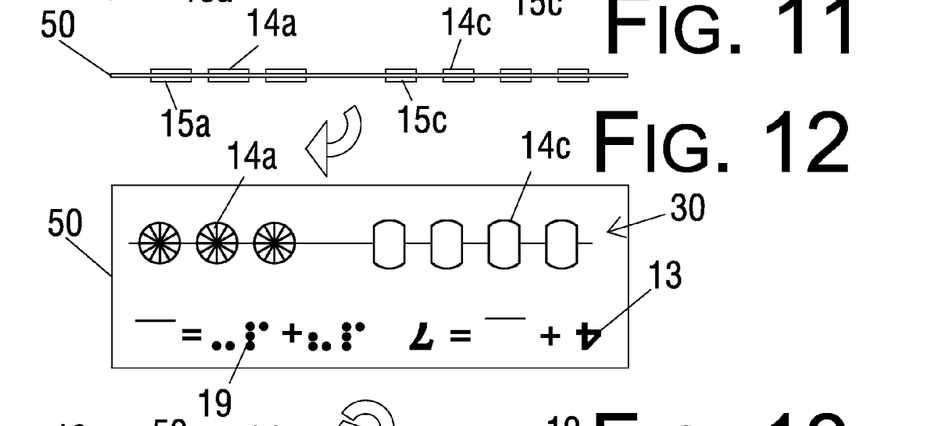
FIG. 11 shows a cut view of the learning aid of FIG. 9 taken along line 11-11.
FIG. 12 shows a back view of the learning aid of FIG. 9, with the learning aid of FIG. 9 flipped forward 180 degrees.
Figure 13:
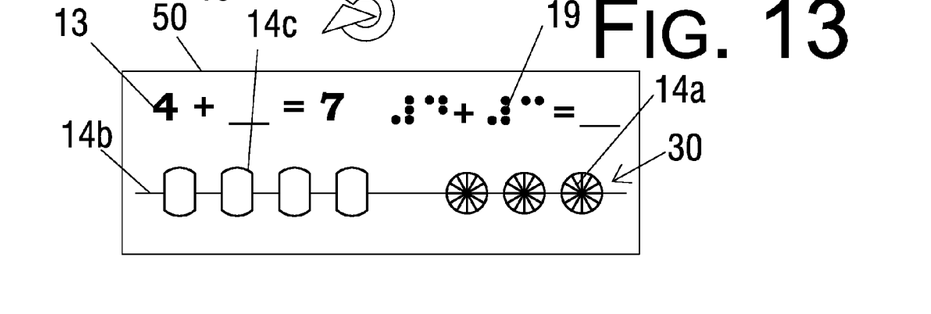
FIG. 13 shows a back view of the learning aid of FIG. 9, with the learning aid of FIG. 9 flipped forward 180 degrees and rotated 180 degrees clockwise.

The top view of FIG. 10 and the cut view of FIG. 11, illustrate front tactile graphics 15a, 15b, 15c protruding from the front surface of the carrier medium 50 and back tactile graphics 14a, 14b, 14c protruding from the back surface of the carrier medium 50—in an aligned manner.

The learning aid 10 of FIG. 9 to FIG. 13 illustrates multiple front-to-back aligned tactile graphics. A first set of front-to-back aligned tactile graphics (front graphic 15a and back graphic 14a) represents the "3" of the math fact; a second set of front-to-back aligned tactile graphics (front graphic 15c and back graphic 14c) represents the "4"; and a third front-to-back aligned tactile graphic (front graphic 15b and back graphic 14b) represents the string of the beads-on-a-string manipulative.

Additionally, non-aligned tactile graphics may be optionally included on the learning aid 10 to further enable usage of the learning aid 10 (such as by Braille readers). These non-aligned tactile graphics are represented by the Braille 19 math fact.

Figures 23, 24:
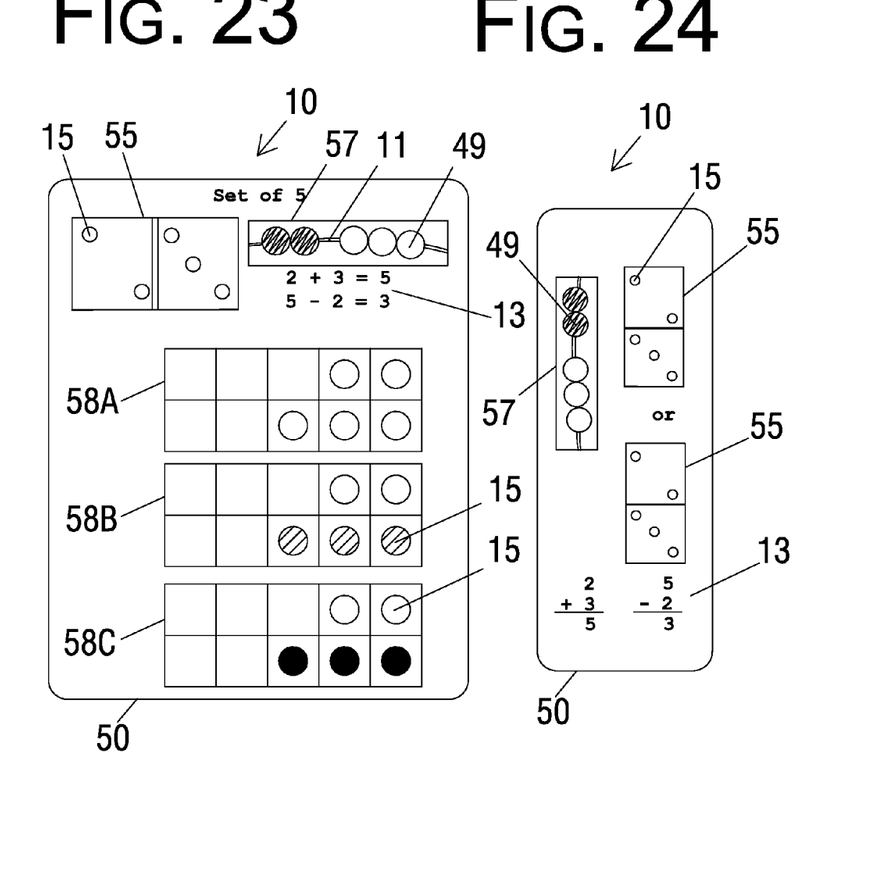
FIGS. 23-25 show the double-sided, front-to-back aligned tactile learning aid of the present invention incorporating one or more domino representations.
Figure 25:
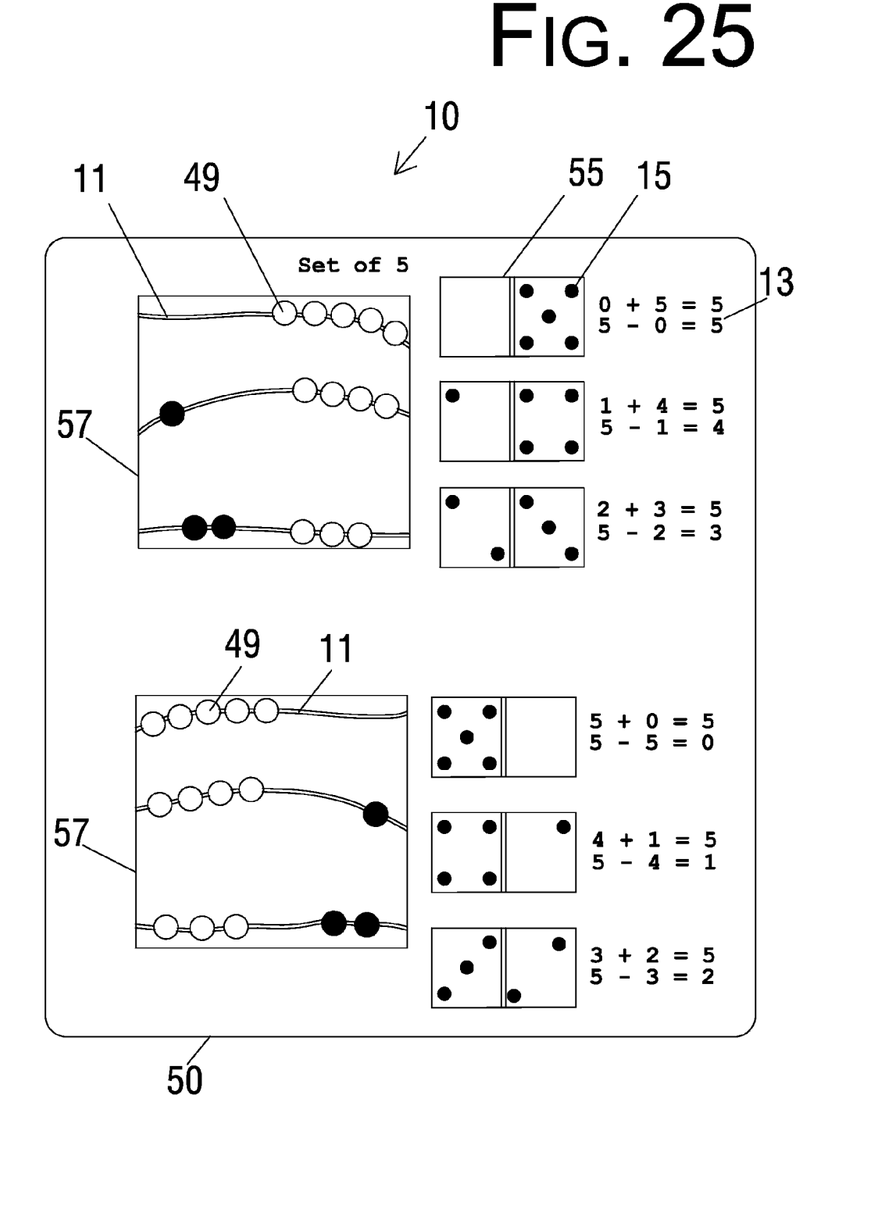

Further non-tactile graphics may be included on the learning aid 10, such as the non-tactile printing of the numeral math fact 13 (FIGS. 23-25). For example, it might be desirable for students with limited vision and/or sighted students and/or teachers to have the math fact in numerals as an additional reference, optionally with color-coding. Optionally, if desired, the numeral math fact 13 may be tactile, but protruding from only a single side of carrier medium 50.

When using swelled paper, for example, if the math fact is to be non-tactile, it can be printed in color, thus it will not rise when swelled paper is put through the swelled paper image enhancer. If the math fact is to be tactile, it can be printed in black, thereby causing the math fact to be raised when it is put through the swelled paper image enhancer. Optionally, if desired, a non-tactile picture 57 (FIG. 23, 24, 25) of the object represented by the front-to-back aligned tactile graphic may be included.

The top view of FIG. 10 and the cut view of FIG. 11, illustrate front tactile graphics 15a, 15b, 15c protruding from the front surface of the carrier medium 50 and back tactile graphics 14a, 14b, 14c protruding from the back surface of the carrier medium 50. Visually-impaired and non-visually impaired students can feel the front and back aligned graphics.

Figure 14:
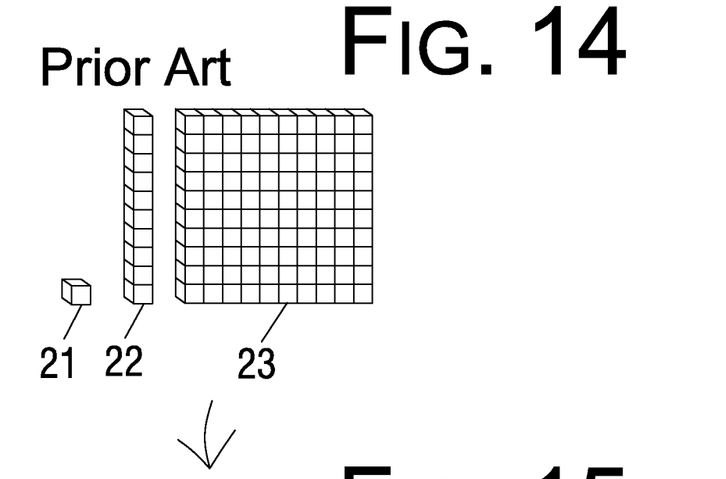
FIG. 14 shows three-dimensional unit blocks of the prior art.
Figure 15:
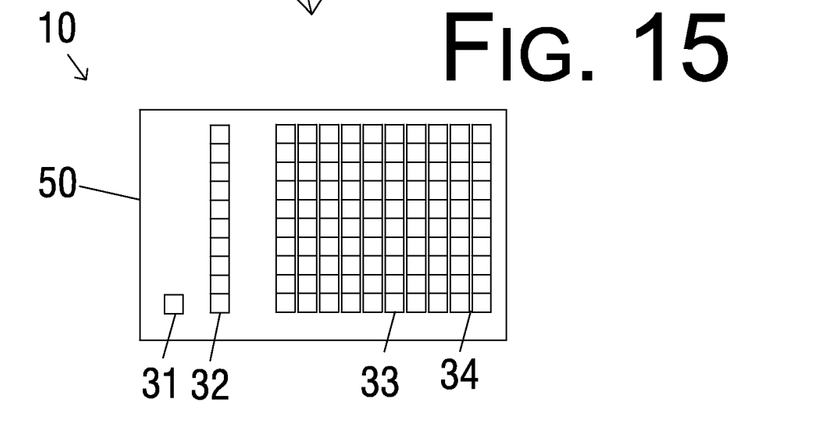
FIG. 15 shows a front view of an exemplary second embodiment of the double-sided, front-to-back aligned tactile learning aid of the present invention as a generally planar representation of the three-dimensional unit blocks of the prior art of FIG. 14.
Figure 16:
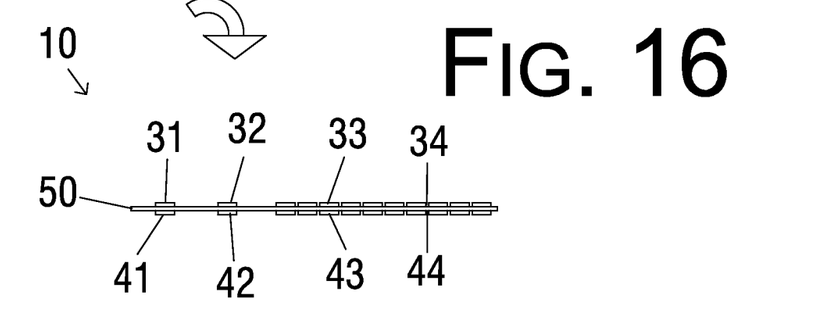
FIG. 16 shows a top view of the second embodiment of the double-sided, front-to-back aligned tactile learning aid of the present invention illustrating the alignment of the upper and lower protrusions.

Turning to FIG. 15 to FIG. 16 a second exemplary embodiment of the double-sided, front-to-back aligned tactile learning aid 10 of the present invention is illustrated. The second embodiment shows the representation of the prior art unit blocks of FIG. 14 by the generally planar learning aid 10 of FIG. 15 and FIG. 16. The second embodiment illustrates that in particular situations some modifications or adjustments of the three-dimensional object may need to be made to adapt the three-dimensional object to the semi-concrete representation of the learning aid 10 of the present invention, while retaining the essence or meaning of the three-dimensional object. While the three-dimensional single unit 21 and ten unit 22 closely correspond to the generally two-dimensional single unit representation 31 and ten unit representation 32, the hundred unit, representation 33 of prior art hundred unit 23 is modified with interspersed depressions 34 or indentations. The depressions 34 (FIG. 16) facilitate the interpretation of the representation using the sense of touch. Thus modifications when progressing from the three-dimensional object to the generally two-dimensional, double-sided, front-to-back aligned tactile learning aid 10 are within the scope of the invention.

Figure 17:
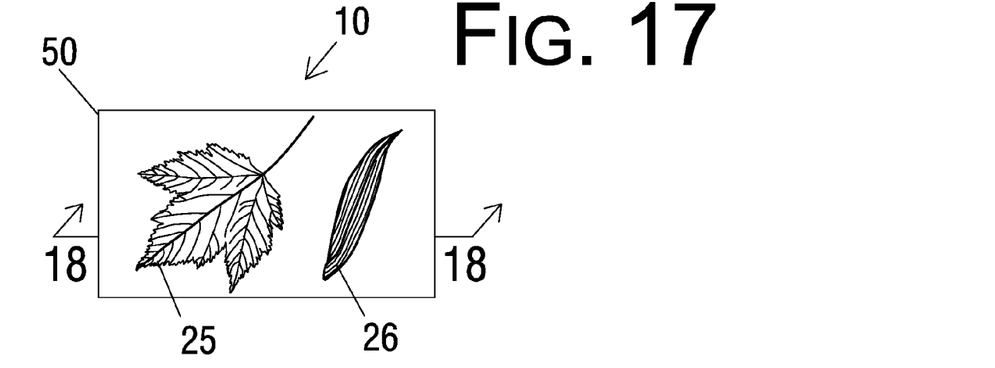
FIG. 17 shows a front view of a science-related third embodiment of the double-sided, front-to-back aligned tactile learning aid of the present invention.
Figure 18:
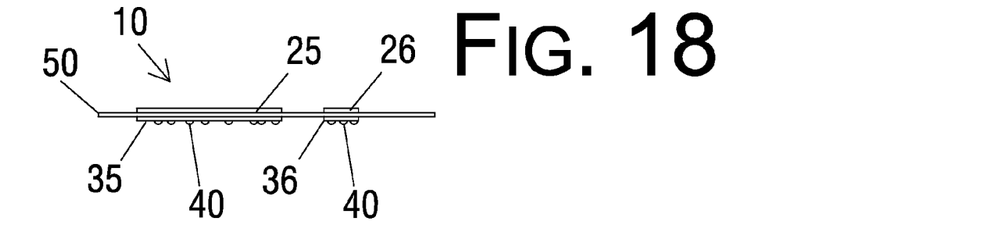
FIG. 18 shows a cut view, taken along line 18-18 of FIG. 17, of the science-related third embodiment of the double-sided, front-to-back aligned tactile learning aid of the present invention.

FIG. 17 and FIG. 18 illustrate that the tactile front graphic 25, 26, though at least partially aligned with the tactile back graphic, need not be identical to the back graphic. FIG. 17 and FIG. 18 also illustrate the utilization of the double-sided, front-to-back aligned tactile learning aid 10 to teach science facts, such as the illustrated representation of leaves from monocot and dicot plants. The front graphic 25, 26 is substantially aligned with the back graphic 35, 36. However, the veins 40 of the leaves may optionally be more pronounced (or only touchable) on the back graphic 35, 36, as would be the veins of a typical leaf. Therefore, the student may touch the shape of the leaf (front graphic 25, 26) and simultaneously touch the shape of the leaf with pronounced veins (back graphic 35, 36 and leaf veins 40). The student can easily manipulate the learning aid 10 and can easily study and compare the vein structures of the two types of leaves. The learning aid 10 also provides advantages to the teacher. The learning aid 10 is sturdy, easy-to-store, convenient, long-lasting, and readily available for usage during all seasons, thus having advantages over three-dimensional natural leaves, yet being accurately representational.

Figure 19:
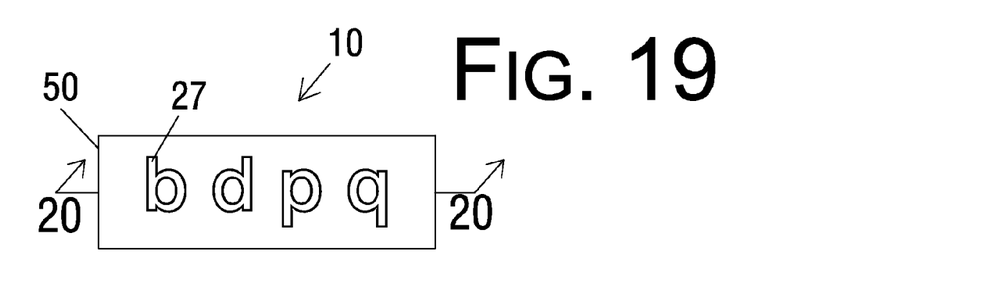
FIG. 19 shows a front view of a language arts-related fourth embodiment of the double-sided, front-to-back aligned tactile learning aid of the present invention.
Figure 20:
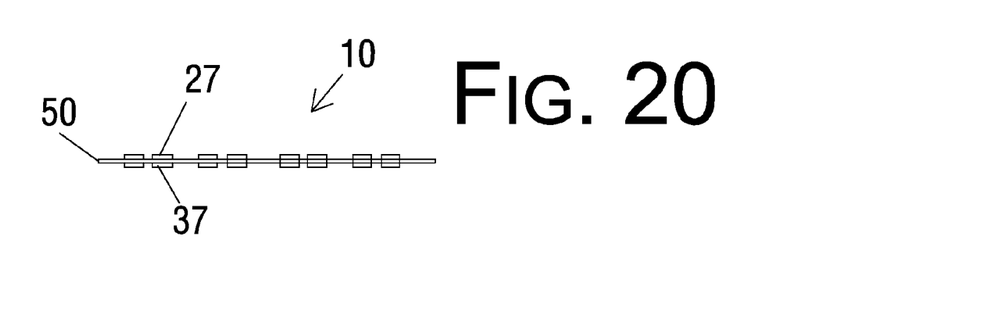
FIG. 20 shows a cut view, taken along line 20-20 of FIG. 19, of the language arts-related fourth embodiment of the double-sided, front-to-back aligned tactile learning aid of the present invention.

FIG. 19 and FIG. 20 illustrate the utilization of the double-sided, front-to-back aligned tactile learning aid 10 to teach language art facts. For example, early readers often confuse the letters "b", "d", "p", and/or "q". The conventional, printed letters on flash cards or paper are non-tactile. For some students (especially kinesthetic learners), it may be advantageous to touch and trace with the fingertips the aligned front graphic 27 and the back graphic 37, thus allowing the student to move beyond the conventional non-tactile printed letter to a semi-concrete representation of the letter structure provided by the double-sided, front-to-back aligned tactile learning aid 10 of the present invention. The added front-to-back aligned tactile aspect built on the traditional flash card or teaching aid concepts stimulates unexplored learning paths.

FIG. 21-22 show the formation of the learning aid unitarily molded of a plastic resin and folded along fold line 51. When folded, the front graphic 15 aligns with the back graphic 14.

An adhesive (or other adhering means) may be used to permanently secure the learning aid in the folded position. As seen in FIG. 21, to enhance the tactile experience for the student, the protruding graphic of one shape may differ from another shape. In this example, the square protruding graphic is formed with sharp angles (emulating the right angles of the top of a square) while the circular protruding graphic is rounded (emulating the rounded feel of the top of a circle). Optionally, the front-to-back aligned tactile learning aid 10 can be formed molded in a single piece with the front and back protrusions formed unitarily with the carrier medium.

FIG. 23-25 show the usage of the aligned, tactile learning aid coordinated with the usage of dominos 55 (which may be commonly used for teaching mathematical concepts). As shown in FIG. 23, a picture 57 of the holed objects 49 on a string 11 may be placed near a domino graphic and near one or more aligned, tactile chart graphics 58A, 58B, 58C, with the represented mathematical fact(s) 13 printed nearby. Thus the student sees the picture of the physical objects (holed objects 49) and correlates the mathematical facts 13, the domino 55, and the chart graphics 58A, 58B, 580. Both the domino graphic 55 and the chart graphics 58A, 58B, 580 may be the front-to-back aligned tactile graphics of the present invention.

Similarly, in FIG. 24, dominoes 55, a picture 57 of the holed objects 49, and mathematical facts 13 are placed on the learning aid 10. The dots of the domino as well as the edges may protrude from both the top and bottom of the learning aid 10, forming a front-to-back aligned domino graphic. The front-to-back aligned, tactile domino graphic is a semi-abstract representation of a domino, yet provides greater ease of storage and handling than a physical domino. The additional opportunity to provide both a front and back alignment of the domino dots allows new interactions beyond a traditional one-sided domino.

FIG. 25 shows the learning aid 10 incorporating pictures 57 of the holed objects 49 representing the math facts 13 with front-to-back aligned tactile domino graphic 55. The picture 57 shows the holed objects 49 on strings 11 illustrating the set of math facts 13 with corresponding tactile domino graphics 55. Optionally other pictures 57 may be included, such as to show the strings 11 with holed objects 49 flipped to represent the corresponding math facts 13.

A single learning aid 10 may have a single front-to-back aligned tactile graphic (such as a single shape), two or more front-to-back aligned tactile graphics (for example, a representation of division with dividends, divisors, and remainders using beads on a string might use three types), or a combination of front-to-back aligned tactile graphics with non-tactile printing or colors (as illustrated in FIG. 9).

The incorporation of the tactile aspect into the generally planar learning aid 10 (as compared to the traditional strictly two-dimensional pictorial learning aid of the prior art) creates a true semi-concrete bridge; it allows the student to use not only the sense of sight, but also the sense of touch, thus enhancing learning. Visually-impaired and non-visually impaired students can feel the front and back aligned graphics.

The front-to-back aligned learning aid 10 of the present invention is also convenient and efficient to use, as it is a compact representation of a three-dimensional object. The physical objects take significant storage space (for example, unit blocks representing ones, tens, hundreds, and thousands for each of the students in a classroom will take a large amount of room to store and will be difficult to hand out, to set-up, and to transport. The aligned learning aid representing the physical object is a generally planar (with protrusions) card 39 (FIG. 9), so multiples may be conveniently stored in a box or holder, similar to flashcard storage. The reduction in storage space allows better utilization of limited classroom space. Additionally, the aligned learning aid 10 may be more easily sent home with children in a backpack for home study, because of its ease of transport and because it has no loose parts to lose. This is in contrast to the physical objects, such as unit blocks, which are not only bulky to transport, but are also composed of multiple, easy-to-lose pieces.

Efficiency is provided by the flat, flashcard-like structure of the aligned learning aids 10. The card 39 (FIG. 9) of the learning aid 10 will not roll off desks. They are not noisy to use. They do not lend themselves to creative and imaginative play by students (students pretending a physical manipulative is something else), so the students are less distracted but remain on task longer.

Additionally, the time spent by teachers and students to set up, move, use, and return learning activities is reduced by use of the front-to-back aligned learning aid 10. This convenience allows increased efficiency in the usage of limited classroom learning time. Additionally, students can consistently use the aligned learning aid 10 independently and correctly after instruction by the teacher thereby increasing valuable practice time. Also, the students do not need to spend time to construct and deconstruct individual, non-connected manipulative pieces. Further, the ease of distribution of the appropriate one or set of the aligned learning aid 10, allows the teacher to quickly individualize learning; each child can focus on the facts specific to their needs without the set-up time required for distributing and explaining an equivalent individualized learning center using physical objects. The use of the front-to-back aligned learning aid 10 of the present invention fosters frequent independent usage without needing direct teacher supervision, thus increasing learning. This reduction in time required by both teachers and students assures that the learning aid will be used more frequently in the classroom and in other settings.

Further, due to the representational and compact nature of the aligned learning aid 10, the concept to be learned is presented in a structured manner. Thus the aligned learning aids 10 are used correctly and effectively the majority of the time, allowing more independent learning and reducing teacher monitoring. The increased experience with the aligned learning aids helps the student build and store memories for later retrieval. With increased use, a strong schema/memory base is created that helps the student by forming a strong mental picture from which the student can draw upon to remember the information learned.

Thus the convenience of use of the aligned learning aids 10 promotes increased frequency of usage throughout the day. This increased frequency of exposure to the subject matter allows ready retention and assimilation by the student. Multiple, short periods of usage, such as twenty times per day, is permitted by the increased convenience of the learning aid 10, which is in direct contrast to the single, necessarily long period of usage for a physical manipulative, due to the large set-up/take-down time involved.

The double-sided, front-to-back aligned tactile learning aid 10 may be used to teach a wide variety of subject matter and may be used in a variety of formats, such as, for example, usage as flashcards 39 (FIG. 9), measuring units, mathematic explanations and conceptualizations, games (such as card games or matching games), visualization of arrays, and other teaching and learning aids.

Though single-sided tactile graphic learning aids are currently listed in the comprehensive BANA Tactile Graphic Guidelines and are available to students, the double-sided, front-to-back aligned tactile learning aid of the present invention enhances learning beyond what is currently available.

Additionally, the double-sided, front-to-back aligned tactile learning aid 10 may be advantageously used with students with autism spectrum disorders (ASD). The multisensory learning aid 10 encourages a higher level of interaction for the student with ASD, increasing the student's engagement and involvement through the tactile experiences with the learning aid 10.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. A learning aid, comprising:
    a substantially planar carrier medium having a front side and a back side;
    a front tactile graphic disposed on and protruding from said front side of said carrier medium; and
    a back tactile graphic disposed on and protruding from said back side of said carrier medium, wherein said back tactile graphic is substantially aligned with said front tactile graphic;
    wherein said carrier medium comprises at least one sheet of Braille paper.

2. The learning aid, as recited in claim 1, wherein at least a portion of said back tactile graphic comprises a beads-on-a-string graphic.

3. The learning aid, as recited in claim 1, further comprising a one-sided graphic protruding from a front side of said carrier medium.

4. The learning aid, as recited in claim 1, further comprising Braille printed on at least one of said front side of said carrier medium and said backside of said carrier medium.

5. A learning aid, comprising:
    a substantially planar carrier medium having a front side and a back side;
    a front tactile graphic disposed on and protruding from said front side of said carrier medium; and
    a back tactile graphic disposed on and protruding from said back side of said carrier medium, wherein said back tactile graphic is substantially aligned with said front tactile graphic;
    wherein said carrier medium comprises at least one sheet of standard paper.

6. The learning aid, as recited in claim 5, wherein at least a portion of said back tactile graphic comprises a beads-on-a-string graphic.

7. The learning aid, as recited in claim 5, further comprising a one-sided graphic protruding from a front side of said carrier medium.

8. A learning aid, comprising:
    a substantially planar carrier medium having a front side and a back side;
    a front tactile graphic disposed on and protruding from said front side of said carrier medium; and
    a back tactile graphic disposed on and protruding from said back side of said carrier medium, wherein said back tactile graphic is substantially aligned with said front tactile graphic;
    wherein said carrier medium comprises two sheets of paper, adjoined back-to-back.

9. The learning aid, as recited in claim 8, wherein said two sheets of paper are adjoined with adhesive.

10. The learning aid, as recited in claim 8, wherein at least a portion of said back tactile graphic comprises a beads-on-a-string graphic.

11. The learning aid, as recited in claim 8, further comprising a one-sided graphic protruding from a front side of said carrier medium.

12. The learning aid, as recited in claim 8, further comprising Braille printed on at least one of said front side of said carrier medium and said backside of said carrier medium.

13. A method of forming a double-sided aligned learning aid, comprising:
    creating a first raised graphic on a first sheet of paper;
    creating a second raised graphic on a second sheet of paper, wherein said second raised graphic is the inverse of said first raised graphic; and
    adhering the back of said first sheet of paper to the back of said second sheet of paper aligning said first raised graphic and said second raised graphic.

14. The method of forming a double-sided aligned learning aid, as recited in claim 13, wherein
    creating a first raised graphic on a first sheet of paper comprises embossing; and
    creating a second raised graphic on a second sheet of paper comprises embossing.

15. The method of forming a double-sided aligned learning aid, as recited in claim 13, wherein
    creating a first raised graphic on a first sheet of paper comprises swelling capsule paper with heat creating a first raised graphic on a first sheet of paper comprises swelling capsule paper with heat; and
    creating a second raised graphic on a second sheet of paper comprises swelling capsule paper with heat.

16. The method of forming a double-sided aligned learning aid, as recited in claim 13, wherein
    creating a first raised graphic on a first sheet of paper comprises swelling capsule paper with heat creating a first raised graphic on a first sheet of paper comprises swelling capsule paper with heat; and
    creating a second raised graphic on a second sheet of paper comprises swelling capsule paper with heat.

17. A flashcard, comprising:
    a substantially planar carrier medium having a front side and a back side;
    a front tactile graphic disposed on and protruding from said front side of said carrier medium; and
    a back tactile graphic configured to be the inverse of said front tactile graphic and disposed on and protruding from said back side of said carrier medium, said back tactile graphic is substantially aligned with said front tactile graphic
    wherein said carrier medium comprises a front sheet and a back sheet, wherein said front sheet is adhered to said back sheet.

18. The flashcard, as recited in claim 17, wherein:
    said front tactile graphic is formed by swelling capsule paper with heat; and
    said back tactile graphic is formed by swelling capsule paper with heat.

19. The flashcard, as recited in claim 17, wherein:
    said front tactile graphic is formed by embossing; and
    said back tactile graphic is formed by embossing.

20. A flashcard, wherein comprising:
    a substantially planar carrier medium having a front side and a back side;
    a front tactile graphic disposed on and protruding from said front side of said carrier medium; and a back tactile graphic configured to be the inverse of said front tactile graphic and disposed on and protruding from said back side of said carrier medium, said back tactile graphic is substantially aligned with said front tactile graphic
said planar carrier medium comprises a paper sheet.

21. The flashcard, as recited in claim 20, wherein said planar carrier medium is formed by an injection molding process.

22. The flashcard, as recited in claim 20, wherein said planar carrier medium comprises a plastic sheet.

\* \* \* \* \*